(12) United States Patent
Terada

(10) Patent No.: US 6,381,415 B1
(45) Date of Patent: Apr. 30, 2002

(54) FLASH APPARATUS AND CAMERA USING THE SAME

(75) Inventor: Hiroshi Terada, Mitaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/619,687

(22) Filed: Jul. 19, 2000

(30) Foreign Application Priority Data

Jul. 21, 1999 (JP) .......................................... 11-206235
Jul. 21, 1999 (JP) .......................................... 11-206236

(51) Int. Cl.[7] .............................................. G03B 17/02
(52) U.S. Cl. ......................... 396/176; 396/200; 362/16
(58) Field of Search ...................... 396/62, 155, 175, 396/176, 200; 362/16, 17, 18

(56) References Cited

U.S. PATENT DOCUMENTS 4,017,727 A * 4/1977 Yamamoto .................... 362/16
4,304,479 A * 12/1981 Van Allen .................... 396/200
4,325,621 A * 4/1982 Iwata et al. .................. 396/175
4,609,269 A * 9/1986 Kamata ......................... 396/62
4,666,280 A * 5/1987 Miyawaki et al. ........... 396/175
4,941,070 A * 7/1990 Ogawa et al. ................. 362/3

FOREIGN PATENT DOCUMENTS

JP 63-259527 10/1988

* cited by examiner

*Primary Examiner*—David M. Gray
*Assistant Examiner*—Rochelle Blackman
(74) *Attorney, Agent, or Firm*—Frishauf, Holtz, Goodman, Langer & Chick, P.C.

(57) ABSTRACT

A flash apparatus is provided with a flash tube of the point light source type, a reflector, and a diffuser panel. The reflector reflects light flux from the flash tube forward. The diffuser panel is placed in a light flux passing position in front of the flash tube and the reflector and diffuses the light flux from the flash tube. The diffuser panel is so formed that diffusion angles of the light flux can vary with positions between a center corresponding to a light-emitting axis of the flash tube to a periphery concerning an area where the light flux from the flash tube passes.

12 Claims, 10 Drawing Sheets

FLASH APPARATUS AND CAMERA USING THE SAME

CROSS-REFERENCE TO RELATED APPLICATIONS

This application is based upon and claims the benefit of priority from the prior Japanese Patent Applications No. 11-206235, filed Jul. 21, 1999; and No. 11-206236, filed Jul. 21, 1999, the entire contents of which are incorporated herein by reference.

BACKGROUND OF THE INVENTION

The present invention relates to a flash apparatus and a camera using the same.

A flash apparatus is used for cameras and the like. Conventionally, various types of flash apparatuses are proposed, including a flash apparatus using a flash unit of small bulb type (called point light source type hereafter).

The following describes the first prior art and a problem thereof.

Jpn. Pat. Appln. KOKAI Publication No. 63-259527 discloses a flash apparatus of point light source type with a protector having light diffusion properties in a circumferential direction for preventing effects of shadow caused by a masking shield in the flash unit.

However, a method according to the above-mentioned Jpn. Pat. Appln. KOKAI Publication No. 63-259527 just spreads light distribution by using a protector having light diffusion properties, thus leaving a disadvantage of increasing a light volume loss.

The method according to the above-mentioned Jpn. Pat. Appln. KOKAI Publication No. 63-259527 provides light distribution characteristics in which the flash light distribution itself is uneven and a light volume concentrates on the flash center. Accordingly, a light volume tends to become insufficient on the periphery of a wide angle lens having a short focal length.

The following describes the second prior art and a problem thereof.

Figure 22A:
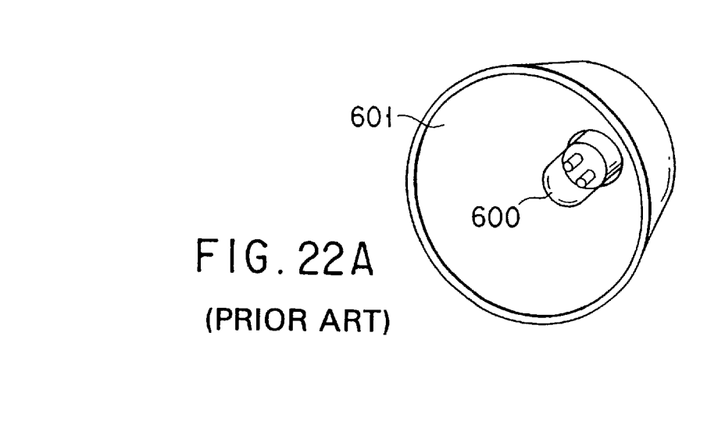
FIGS. 22A and 22B are schematic illustrations for a flash apparatus of the conventional point light source type.

FIG. 22A is a schematic illustration for a flash apparatus of the conventional point light source type. The flash apparatus comprises a xenon flash lamp 600 and a reflector 601 which is arranged almost concentrically (forming a rotational symmetry against a medial axis of the point light source) against the xenon flash lamp 600 for reflecting light flux from this xenon flash lamp 600.

Figure 22B:
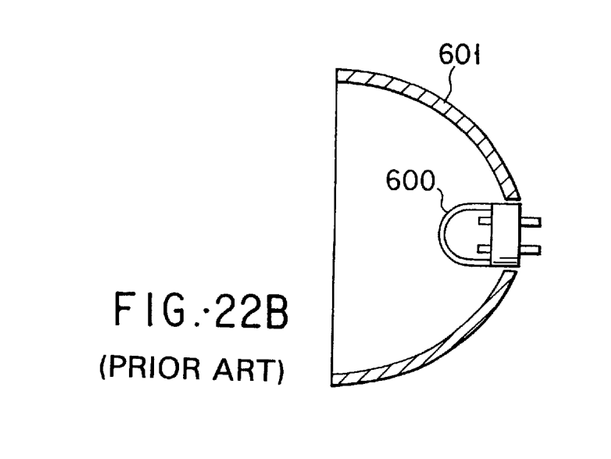

FIG. 22B is a cross-sectional view of the flash apparatus shown in FIG. 22A. As seen from the figure, the conventional flash apparatus has an oval or parabolic sectional form.

Figure 23A:
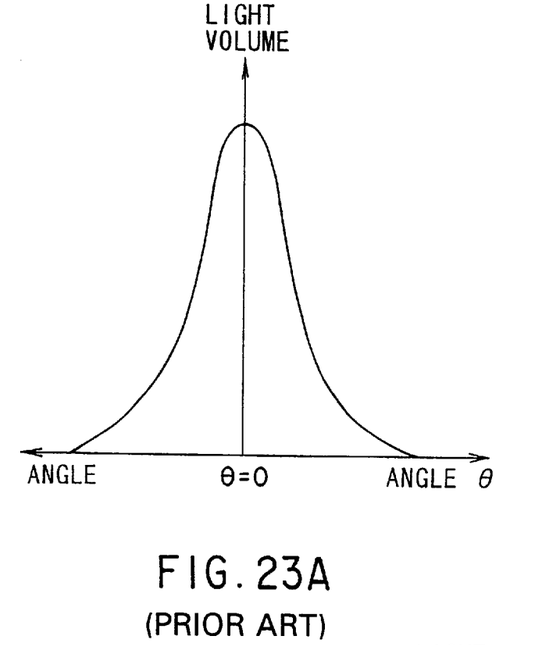
FIGS. 23A and 23B show light distribution characteristics of the conventional flash apparatus.

FIG. 23A provides light distribution characteristics for the conventional flash apparatus. An abscissa axis shows angle θ against the central optical axis. An ordinate axis shows a flash light volume irradiated from the flash apparatus. The reflector 601 is formed almost concentrically with respect to the xenon flash lamp 600. Consequently, same light distribution characteristics are provided in both shorter-side and longer-side directions. As shown in FIG. 23A, this type of light distribution characteristics causes a largest light volume at the optical axis with angle θ=0. The light volume drastically decreases as the angle deviates from the optical axis.

Figure 23B:
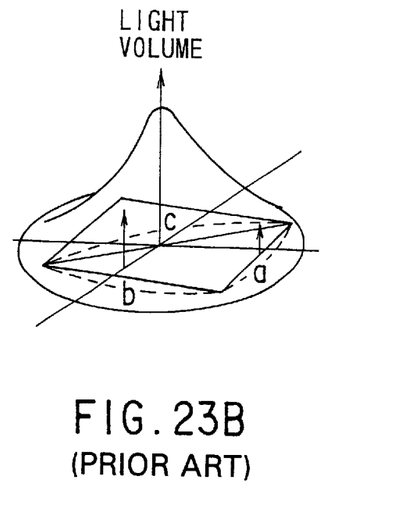

FIG. 23B is a three-dimensional representation of light distribution characteristics for the conventional flash apparatus in FIG. 23A.

Figure 24:
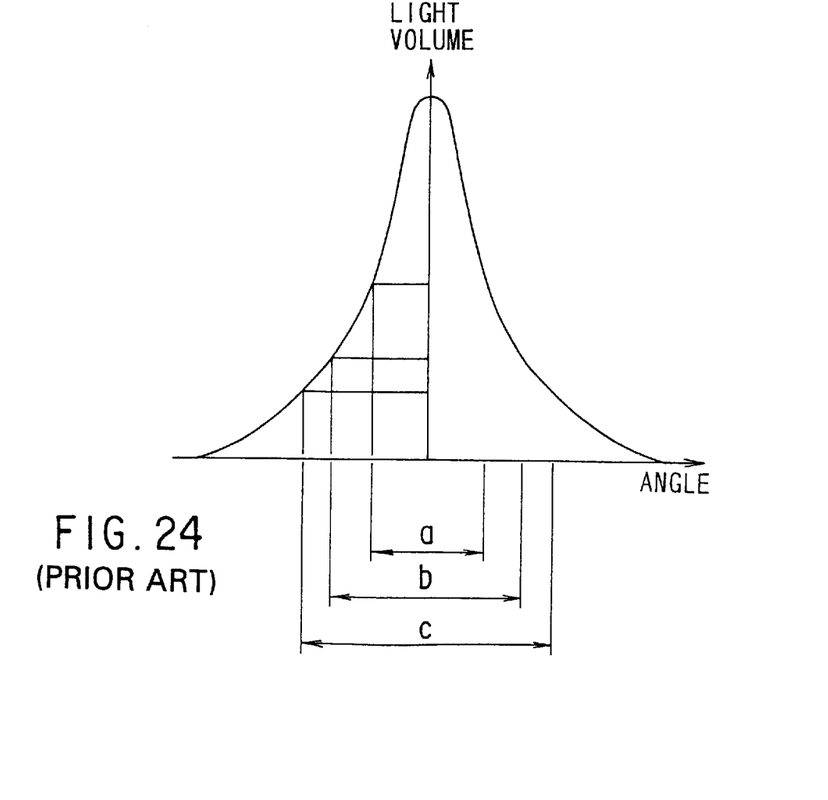
FIG. 24 shows light distribution characteristics of the conventional flash apparatus with respect to relationship among photographic angles of view and light distribution characteristics.

Based on FIG. 23B, FIG. 24 shows light distribution characteristics for the conventional flash apparatus with respect to relationship between a photographic angle of view and light distribution characteristics. In FIG. 24, angle "a" is a necessary angle of view in a shorter-side direction of the film exposure aperture. Angle "b" is a necessary angle of view in a longer-side direction of the film exposure aperture. Angle "c" is a necessary angle of view in a diagonal direction of the film exposure aperture. As seen from the figure, a light volume difference becomes large at ends of each of angles of view, "a", "b", and "c", preventing provision of uniform light distribution characteristics.

With respect to the above-mentioned flash apparatus of the point light source type, Jpn. Pat. Appln. KOKAI Publication No. 63-259527 discloses a flash apparatus whose flash unit is provided with a protector having light diffusion properties in a circumferential direction for uniforming light distribution characteristics.

Conventional flash apparatuses including the above-mentioned Jpn. Pat. Appln. KOKAI Publication No. 63-259527 use a reflector forming a rotational symmetry against the medial axis for the point light source, also providing rotationally symmetrical light distribution. However, the light distribution forms a rectangular shape similar to a picture plane shape. Consequently, just part of the rotationally symmetrical shape is available, causing a problem of a large loss in the light volume.

The present invention has been made in consideration of the problems in the above-mentioned first and second prior arts. It is an object of the present invention to provide a flash apparatus and a camera using the same which can effectively use an energy from a xenon flash lamp of the point light source type.

BRIEF SUMMARY OF THE INVENTION

In order to achieve the above-mentioned object, the first aspect of the present invention relates to a flash apparatus comprising:
  a flash tube of the point light source type;
  a reflector which reflects light flux from the flash tube forward; and
  a diffuser panel which is placed in a light flux passing position in front of the flash tube and the reflector for diffusing the light flux from the flash tube,
    wherein the diffuser panel is so formed that a diffusion angle of the light flux varies with positions between a center corresponding to a light-emitting axis of the flash tube and a periphery concerning an area where light flux of the flash tube passes.

The diffuser panel is so formed that a diffusion angle of the light flux varies with positions between the center corresponding to the light-emitting axis of the flash tube and a periphery on an area where light flux of the flash tube passes.

The second aspect of the present invention relates to a flash apparatus comprising:
  a flash tube of the point light source type;
  a reflector which reflects light flux from the flash tube forward;
  a diffuser panel which is placed in front of the flash tube and the reflector for diffusing light flux from the flash tube; and
  transport means for moving the flash tube relatively to the diffuser panel between a first state irradiating light flux from the flash tube through the diffuser panel and a second state irradiating light flux from the flash tube without using the diffuser panel.

The third aspect of the present invention relates to a flash apparatus comprising:

a flash tube of the point light source type;

a reflector which reflects light flux from the flash tube forward; and a diffuser panel which is placed in a light flux passing position in front of the flash tube and the reflector for diffusing the light flux from the flash tube, wherein the diffuser panel is so formed that a diffusion degree of the light flux varies with positions between a center corresponding to a light-emitting axis of the flash tube and a periphery concerning an area where light flux of the flash tube passes, and the diffuser panel is so formed that a diffusion degree is varied between a vertical direction and a horizontal direction according to the aspect ratio of a square photographic picture plane of the camera.

The diffuser panel is so formed that a diffusion degree of the light flux varies with positions between the center corresponding to the light-emitting axis of the flash tube and a periphery on an area where light flux of the flash tube passes. In addition, the diffuser panel is so formed that a diffusion degree vertically and horizontally varies according to the aspect ratio of a square photographic picture plane of the camera.

The fourth aspect of the present invention relates to a camera having the flash apparatus comprising:

a flash tube of the point light source type for generating flashes; and a reflector which reflects light flux from the flash tube forward, wherein the reflector comprises a reflecting surface having a first curved-face portion for determining the vertical irradiating light distribution and a second curved-face portion for determining the horizontal irradiating light distribution so that irradiating light distribution characteristics can approximately correspond to the size of a rectangular photographic picture plane having vertical and horizontal sides.

The reflector comprises a reflecting surface having a first curved-face portion for determining the vertical irradiating light distribution and a second curved-face portion for determining the horizontal irradiating light distribution so that irradiating light distribution characteristics can correspond to the size of a rectangular photographic picture plane having vertical and horizontal sides.

The fifth aspect of the present invention relates to a camera having a flash apparatus comprising:

a flash tube of the point light source type;

a reflector which reflects light flux from the flash tube forward; and a diffuser panel which is placed in a light flux passing position in front of the flash tube and the reflector for diffusing the light flux from the flash tube, wherein the reflector comprises a reflecting surface having a first curved-face portion for determining the vertical irradiating light distribution and a second curved-face portion for determining the horizontal irradiating light distribution so that irradiating light distribution characteristics can approximately correspond to the size of a rectangular photographic picture plane having vertical and horizontal sides, and wherein the diffuser panel is so formed that a diffusion angle of the light flux varies with positions between a center corresponding to a light-emitting axis of the flash tube and a periphery concerning an area where light flux of the flash tube passes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described in detail, with reference to the accompanying drawings.

Figure 1A:
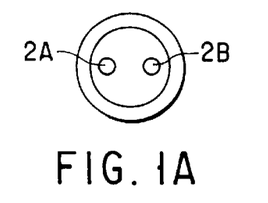
FIGS. 1A and 1B are schematic diagrams for a xenon flash lamp of the point light source type.
Figure 1B:
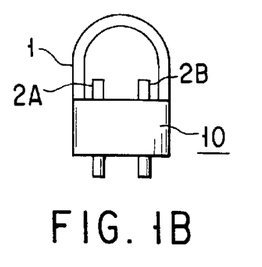

FIGS. 1A and 1B are schematic diagrams for a xenon flash lamp as a flash tube of the point light source type. FIG. 1A is a top view. FIG. 1B is a side view. A xenon flash lamp 10 of the point light source type causes a flash by generating an arc discharge between two electrodes 2A and 2B covered with a glass cap 1.

Figure 2A:
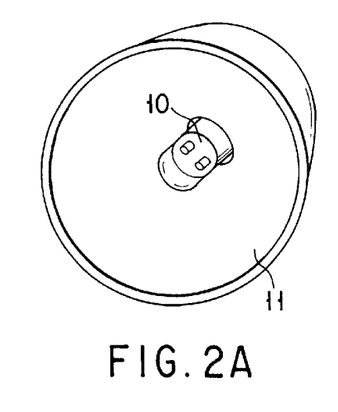
FIGS. 2A and 2B are schematic diagrams for a flash apparatus using the xenon flash lamp of the point light source type.
Figure 2B:
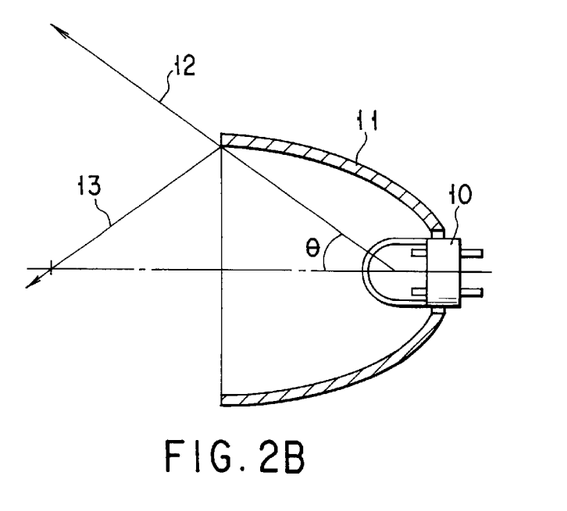

FIGS. 2A and 2B are schematic diagrams for a flash apparatus using the above-mentioned xenon flash lamp of the point light source type. FIG. 2A is a perspective view. FIG. 2B is a cross-sectional view of FIG. 2A. The flash apparatus comprises the xenon flash lamp 10 and a bell-shaped reflector 11 which can reflect light from the xenon flash lamp 10 in specified directions. The flash apparatus is so structured as to illuminate a necessary range by combining direct light 12 from the xenon flash lamp 10 and a reflected light 13 from an inner wall of the reflector 11.

Figure 3A:
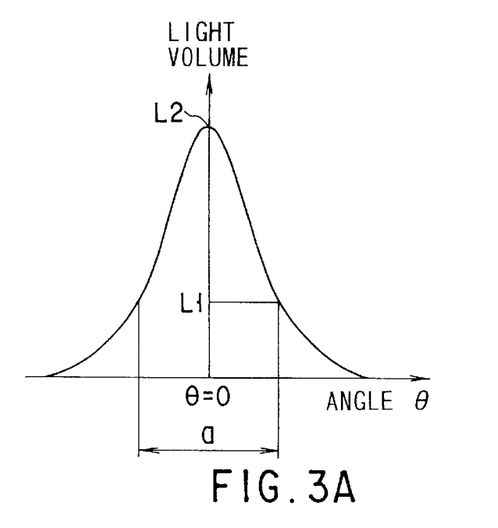
FIGS. 3A and 3B show light distribution characteristics of the flash apparatus.
Figure 3B:
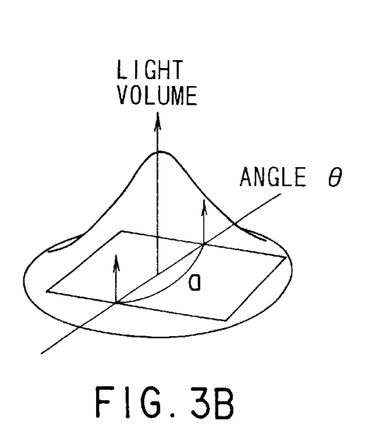

FIG. 3A shows light distribution characteristics of the flash apparatus. The abscissa axis shows angle θ against the central optical axis. The ordinate axis shows a flash light volume irradiated from the flash apparatus. Angle "a" denotes a range (necessary angle of view) needed for photography in a vertical screen direction. FIG. 3B is a three-dimensional representation of light distribution characteristics for the flash apparatus. As seen from the figure, the flash apparatus generates the maximum light volume L2 at the picture plane center (θ=0) within the range of the necessary angle of view "a". The light volume drastically decreases for angles from the picture plane center. The light volume becomes as small as L1 at both ends of the necessary angle of view "a". The conventional flash apparatus provides light distribution characteristics which cause a great difference between the light volume L2 with θ=0 and the light volume L1 at both ends of the necessary angle of view "a". Accordingly, it is impossible to effectively use the light volume of the xenon flash lamp 100 for the entire picture plane.

The following describes embodiments of the present invention for solving this problem.

(First Embodiment)

Figure 4:
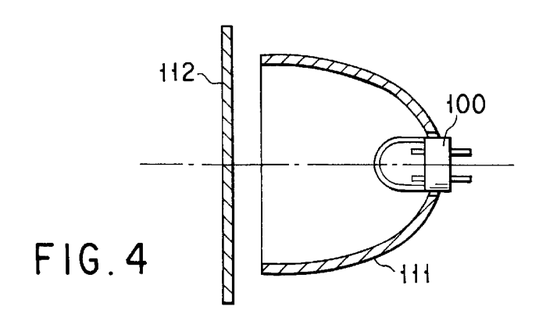
FIG. 4 is a cross-sectional view of the flash apparatus according to the first embodiment of the present invention.

FIG. 4 is a cross-sectional view of the flash apparatus according to the first embodiment of the present invention. The flash apparatus according to this embodiment comprises the xenon flash lamp 100, a reflector 111, and the disk-shaped diffuser sheet (diffuser panel) 112.

The following outlines the diffuser sheet which characterizes this embodiment. The diffuser sheet according to this embodiment employs the holography principle. The diffuser sheet is so formed that a diffusion angle varies with positions where light flux passes. In this embodiment, the diffuser sheet center provides the maximum diffusion angle. A diffusion angle is almost zero at peripheries.

Figure 5A:
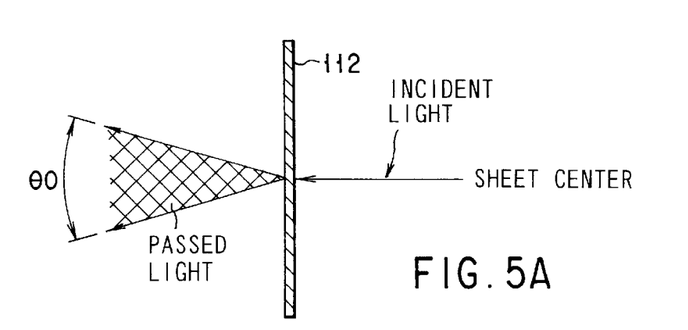
FIGS. 5A through 5C show how a diffusion angle changes on a diffuser sheet as an incident light deviates from the diffuser sheet center.
Figure 5B:
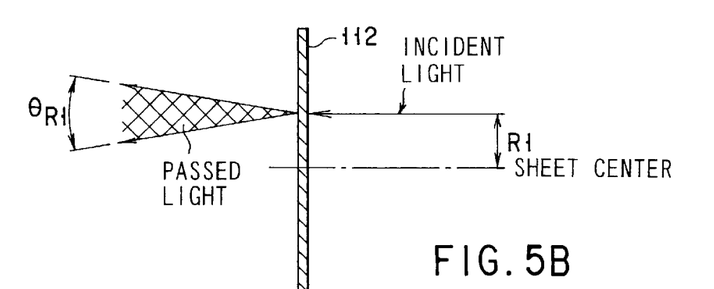
Figure 5C:
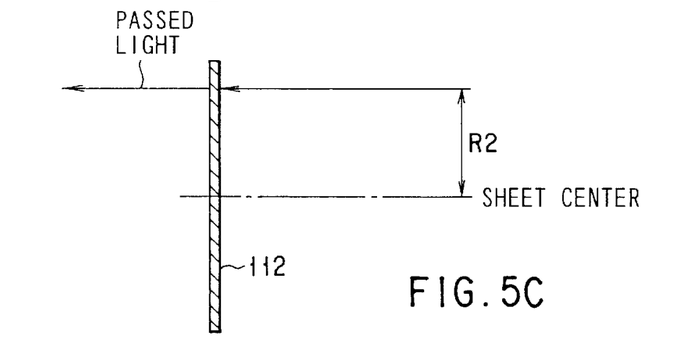

As shown in FIG. 5A, when the light flux from the xenon flash lamp passes the center of the diffuser sheet 112, the emission light from the diffuser sheet 112 causes a diffusion angle of θ0. As shown in FIG. 5B, however, when the light flux from the xenon flash lamp enters at a position with a distance R1 from the center of diffuser sheet 112, the light diffuses at a diffusion angle θR1 which is smaller than θ0. Further as shown in FIG. 5C, when the light flux from the xenon flash lamp enters at a sheet periphery with a distance R2 (greater than R1) from the center of diffuser sheet 112, the incident light is passed from the diffuser sheet 112 almost without diffusion.

Figure 6:
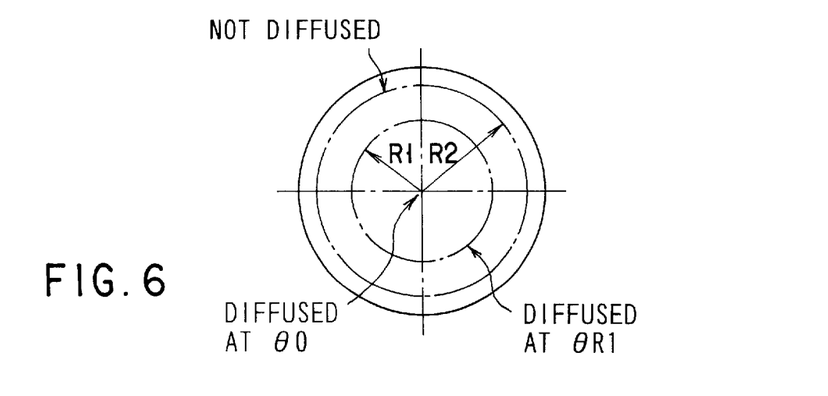
FIG. 6 illustrates distribution of diffusion angles on the diffuser sheet according to the first embodiment of the present invention.

FIG. 6 illustrates distribution of diffusion angles on the above-mentioned diffuser sheet. As shown in the figure, the distribution is concentric. A diffusion angle decreases toward the periphery in the radial direction from the center of the diffuser sheet. Almost no diffusion is observed on the sheet periphery.

Figure 7:
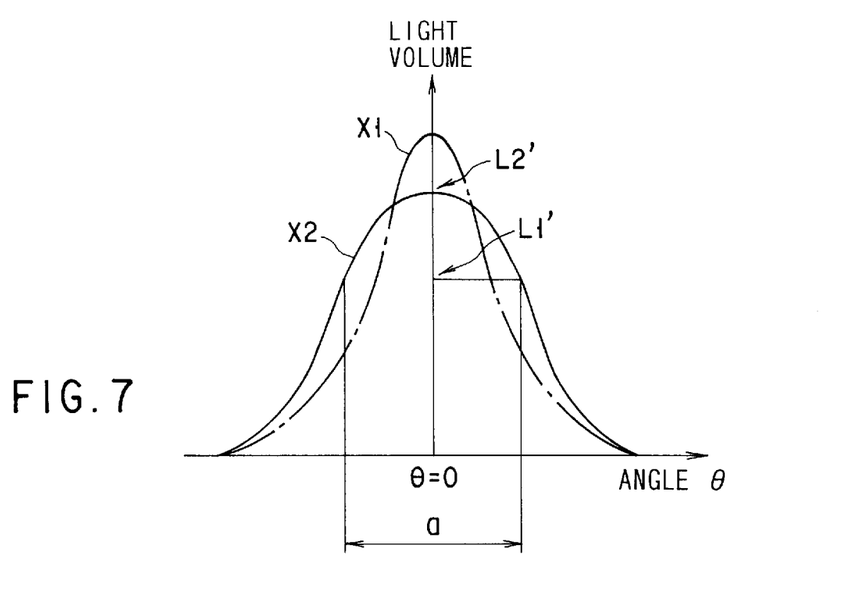
FIG. 7 illustrates an effect using a diffuser sheet 112 according to this embodiment.

FIG. 7 illustrates an effect using the diffuser sheet 112 according to this embodiment. X1 shows the conventional light distribution characteristics and corresponds to the above-mentioned FIG. 3A. X2 shows light distribution characteristics through the use of the diffuser sheet 112 according to this embodiment. As shown in the figure, when the diffuser sheet 112 according to this embodiment is used, the picture plane center (θ=0) provides a light volume L2' which is smaller than the conventional equivalent. However, a light volume L1' becomes larger than the conventional equivalent at both ends of the necessary angle of view "a". A difference between L2' and L1' becomes small, providing excellent light distribution characteristics with little light volume variations within a picture plane. It is possible to effectively use a light volume of the xenon flash lamp.

Figure 8:
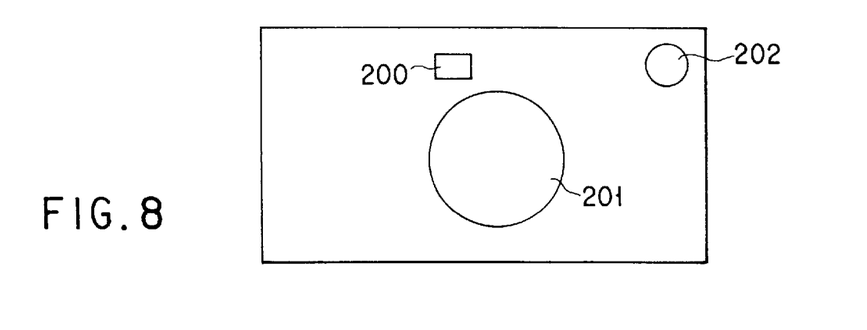
FIG. 8 is a front view of a camera equipped with the flash apparatus according to this embodiment.

FIG. 8 is a front view of a camera equipped with the flash apparatus according to this embodiment. As shown in the figure, the camera is provided with a taking lens 201 at the center, a view finder 200 at the top, and a flash apparatus 202 at the upper-right corner.

(Second Embodiment)

Figure 9A:
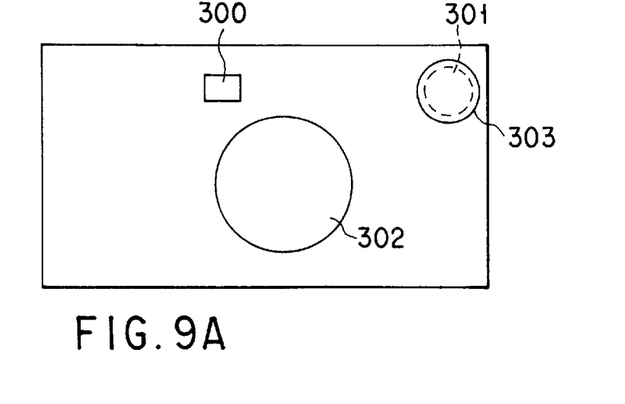
FIGS. 9A through 9D illustrate the second embodiment of the present invention.
Figure 9B:
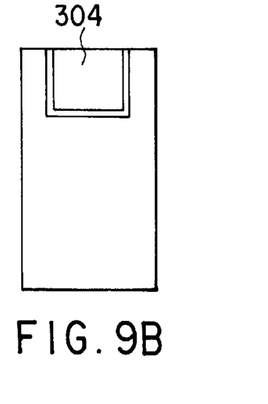
Figure 9C:
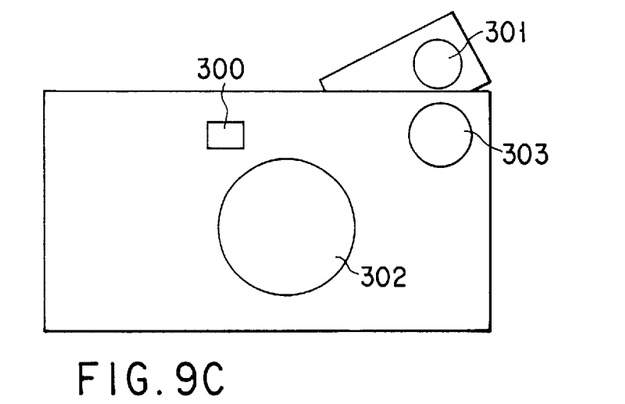
Figure 9D:
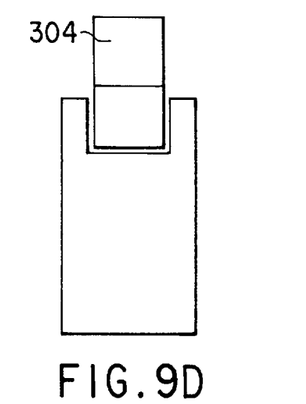
Figure 10:
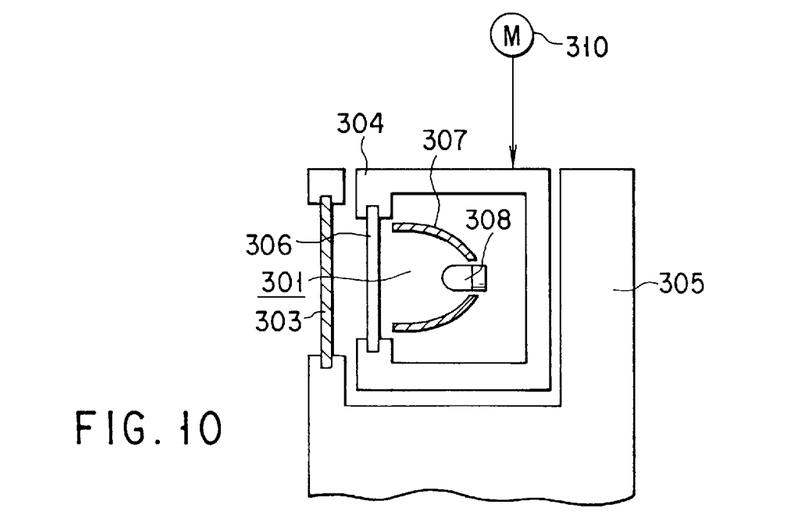
FIG. 10 is a cross-sectional view of a flash case 304.

The following explains the second embodiment of the present invention. The second embodiment is characterized in that the flash apparatus is applied to a camera of a popping-up type. FIGS. 9A and 9B show that the flash case 304 is accommodated in the camera (first state). FIGS. 9C and 9D show that the flash case 304 is popped up (second state). FIG. 10 is a cross-sectional view of the flash case 304. The case contains a flash unit 301 comprising a xenon flash lamp 308 and a reflector 307. A protective panel 306 is provided in front of the case. The flash case 304 is driven by a motor 310 and is movable between the accommodated and pop-up states.

A diffuser sheet 303 is provided in front of a protective panel 306. The diffuser sheet 303 is mounted on a camera body 305. The diffuser sheet 303 has the same structure as the diffuser sheet of the above-mentioned first embodiment.

As shown in FIGS. 9A and 9B, when the flash case 304 is accommodated in the camera body, the diffuser sheet 303 diffuses light flux from the flash unit 301 for providing wide light distribution characteristics equivalent to those obtained at the time of a wide-angle mode.

As shown in FIGS. 9C and 9D, when the flash case 304 pops up from the camera, light flux is directly emitted from the flash unit 301 without passing the diffuser sheet 303, providing narrow light distribution characteristics equivalent to those obtained at the time of a telephoto mode.

Figure 11:
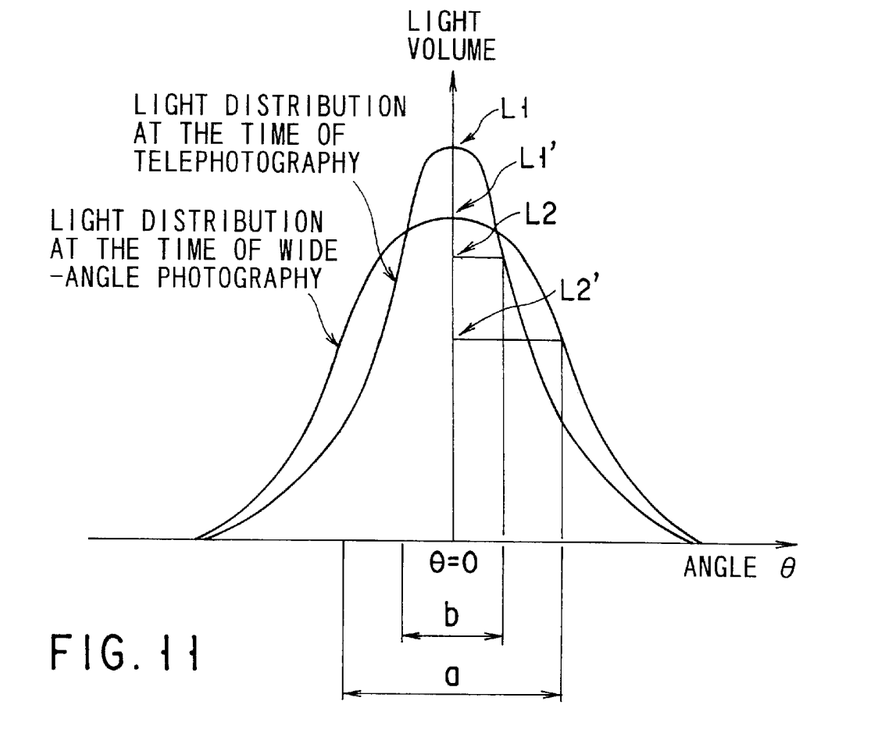
FIG. 11 is a schematic diagram showing changes in light distribution characteristics at the time of wide-angle photography and telephotography.

FIG. 11 is a schematic diagram showing changes in light distribution characteristics for wide-angle photography and telephotography. In this figure, angle "a" is a necessary angle of view for wide-angle photography. Angle "b" is a necessary angle of view for telephotography. L1 is a light volume at the picture plane center for telephotography. L1' is a light volume at the picture plane center for wide-angle photography. L2 is a light volume at the picture plane periphery for telephotography. L2' is a light volume at the picture plane periphery at the time of wide-angle photography. As seen from the figure, the use of the diffuser sheet 303 according to this embodiment provides wide light distribution characteristics at the time of wide-angle photography. In addition, it is possible to decrease a difference between light volume L1' at the picture plane center and light volume L2' at both ends of the angle of view.

The telephotography provides light distribution characteristics similar to those for the prior art. However, the angle of view "b" at the time of the telephotography is narrow, preventing a problem of increasing a difference between light volume L1 at the picture plane center and light volume L2 at both ends of the angle of view. As no diffuser panel is used, a light volume does not decrease at the picture plane. This is appropriate for telephotography.

The second embodiment uses the above-mentioned structure to provide photography by selectively using the first state which emits light flux from the xenon flash lamp through the diffuser panel and the second state which emits light flux from the xenon flash lamp without using the diffuser panel, while maintaining effects of the first embodiment.

(Third Embodiment)

Figure 12:
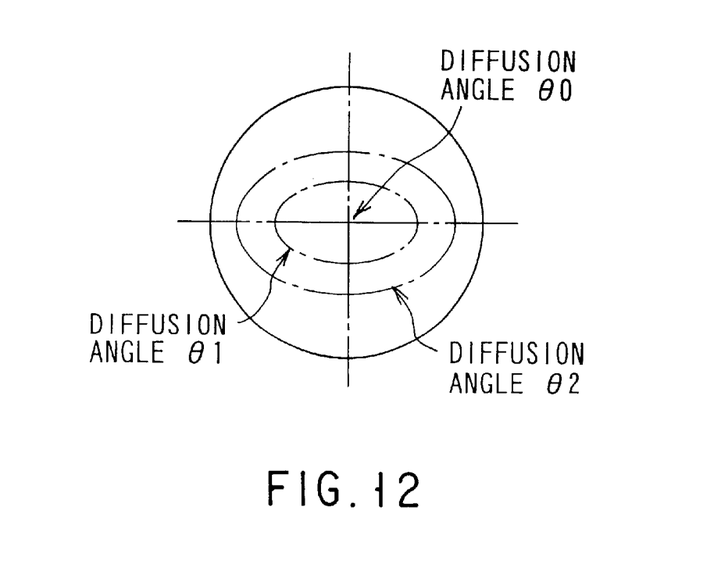
FIG. 12 illustrates distribution of diffusion angles on the diffuser sheet according to the third embodiment of the present invention.

FIG. 12 and FIGS. 13A through 13C illustrate the third embodiment of the present invention. As shown in FIG. 12, the third embodiment is characterized in that the shape of a photographic picture plane used for cameras is considered and diffusion angles produced by the diffuser sheet are varied vertically and horizontally according to an aspect ratio of the photographic picture plane. In FIG. 12, the vertical axis corresponds to the shorter-side direction of the picture plane. The horizontal axis corresponds to the longer-side direction. The distribution of diffusion angles is oval.

Figure 13A:
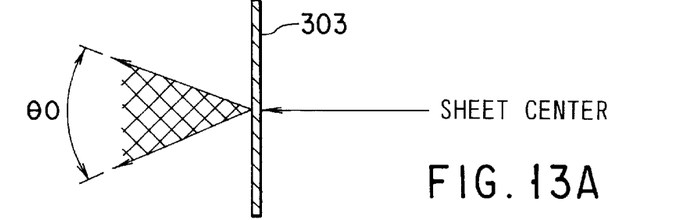
FIGS. 13A through 13C show how a diffusion angle changes on a diffuser sheet as an incident light deviates from the diffuser sheet center.
Figure 13B:
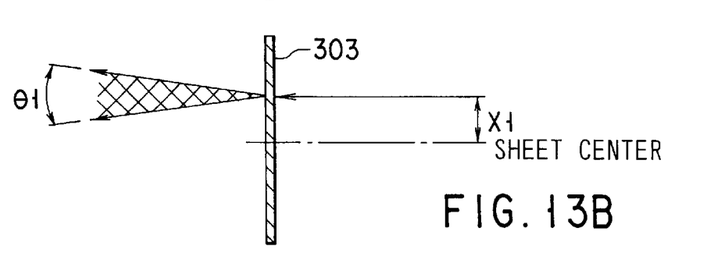
Figure 13C:
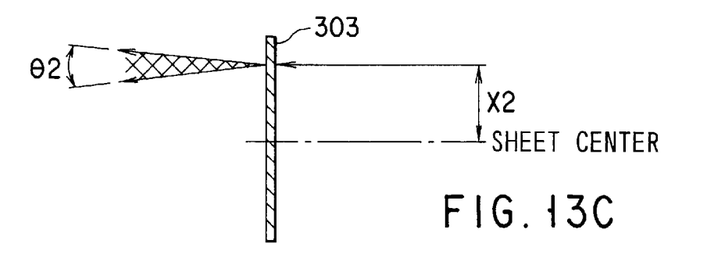

FIGS. 13A through 13C illustrate how a diffusion angle changes on the diffuser sheet as a distance from the diffuser sheet center increases. The diffusion angle decreases as a distance from the picture plane center increases.

As shown in FIG. 13A, when light flux from the xenon flash lamp passes the center of the diffuser sheet 303, a passed light from the diffuser sheet 303 forms diffusion angle θ0. As shown in FIG. 13B, when the light flux from the xenon flash lamp is passed with a distance x1 from the center of the diffuser sheet 303, the light diffuses with a diffusion angle θ1 which is smaller than θ0. Further as shown in FIG. 13C, when the light flux from the xenon flash lamp is passed on a sheet periphery with a distance x2 (larger than x1) from the center of the diffuser sheet 303, the light diffuses with a diffusion angle θ2 which is smaller than θ1.

The above-mentioned third embodiment can provide better light distribution characteristics suitable for the shape of photographic picture planes, making it possible to effectively use a light volume of the xenon flash lamp.

(Fourth Embodiment)

Figure 14:
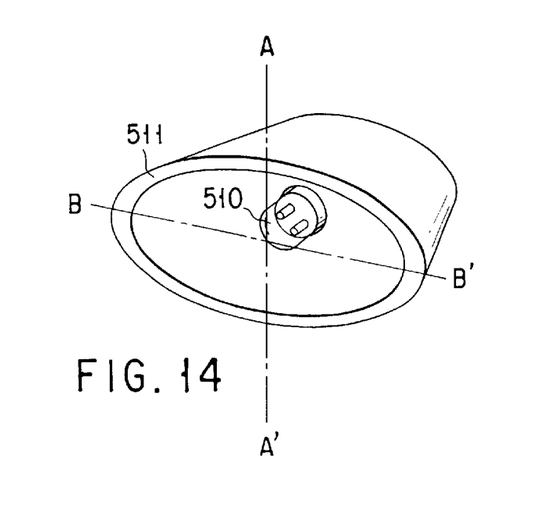
FIG. 14 is a perspective view illustrating the structure of the flash apparatus according to the fourth embodiment of the present invention.

FIG. 14 is a perspective view illustrating the structure of the flash apparatus according to the fourth embodiment of the present invention. The flash apparatus according to this embodiment comprises the xenon flash lamp 510 of the point light source type and a reflector 511 whose entire shape is concave and curved for mounting the xenon flash lamp 510 inside. The reflector 511 has an almost oval opening. In FIG. 14, a line A–A' corresponds to a shorter-side direction of the film exposure aperture. A line B–B' corresponds to a longer-side direction of the film exposure aperture.

Figure 15A:
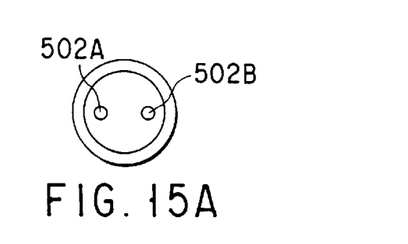
FIGS. 15A and 15B are schematic diagrams for a xenon flash lamp 510 of the point light source type.
Figure 15B:
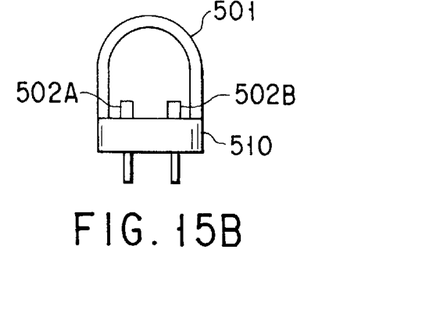

FIGS. 15A and 15B are schematic diagrams for a xenon flash lamp 510 of the point light source type. FIG. 15A is a top view. FIG. 15B is a side view. The xenon flash lamp of the point light source type causes a flash by generating an arc discharge between two electrodes 502A and 502B covered with a glass cap 501.

Figure 16:
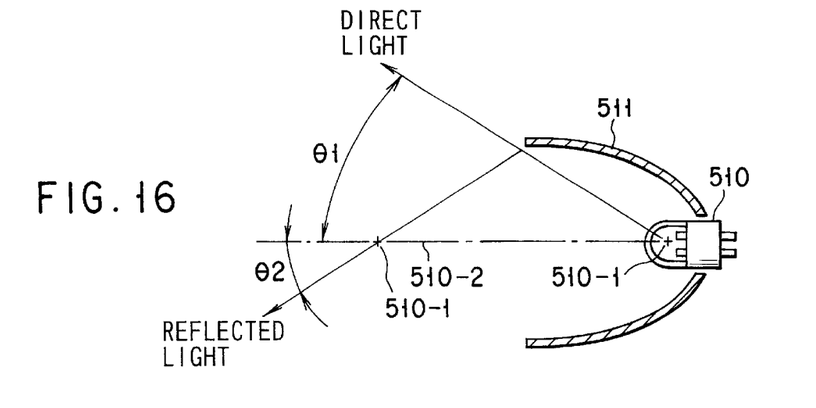
FIG. 16 is a cross-sectional view of the flash apparatus taken in the line A–A' of FIG. 14.

FIG. 16 is a cross-sectional view of the flash apparatus taken in the line A–A' of FIG. 14. As shown in the figure, the reflector 511 is almost oval. The xenon flash lamp 510 is approximately positioned at a focal point 510-1 in this almost oval shape. It is supposed that θ1 is the maximum angle formed by direct light from the xenon flash lamp 510 against an illuminant optical axis 510-2. It is also supposed that θ2 is the maximum angle formed by light from the xenon flash lamp 510 reflected on an inner wall of the reflector 511 against the illuminant optical axis 510-2. When this premise holds, θ1 is almost equal to θ2.

Figure 17:
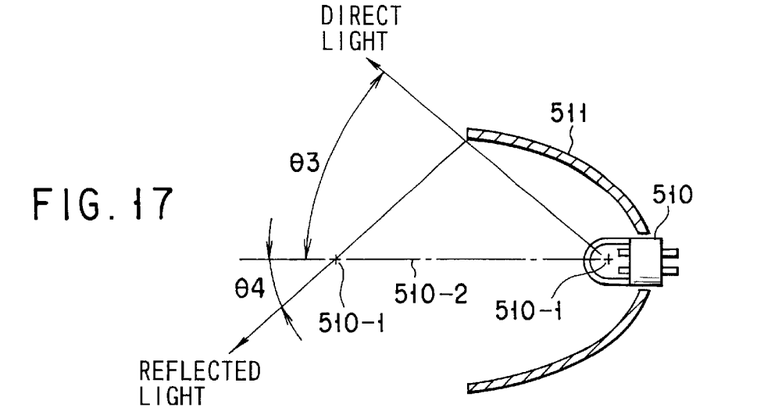
FIG. 17 is a cross-sectional view of the flash apparatus taken in the line B–B' of FIG. 14.

FIG. 17 is a cross-sectional view of the flash apparatus taken in the line B–B' of FIG. 14. As shown in the figure, the reflector 511 is almost oval. The xenon flash lamp 510 is approximately positioned at the focal point 510-1 in this almost oval shape.

As mentioned above, a reflecting surface of the reflector 511 according to this embodiment is provided with a first curved-face portion for determining vertical irradiating light distribution and a second curved-face portion for determining horizontal irradiating light distribution, so as to make each of the irradiating light distributions approximately corresponding to the rectangular photographic picture plane size having vertical and horizontal sizes.

It is supposed that θ3 is the maximum angle formed by direct light from the xenon flash lamp 510 against the illuminant optical axis 510-2. It is also supposed that θ4 is the maximum angle formed by light from the xenon flash lamp 510 reflected on the inner wall of the reflector 511 against the illuminant optical axis 510-2. When this premise holds, θ3 is almost equal to θ4. A sectional form shown in FIG. 17 is equivalent to the longer-side direction of the film exposure aperture. The sectional area is larger than that for the shorter-side direction of the film exposure aperture in FIG. 16. Consequently, θ1 is smaller than θ3, and θ2 is smaller than θ4.

In this embodiment, θ1 is almost equal to θ2, and θ3 is almost equal to θ4. It is not necessarily maintain this relationship.

Figure 18:
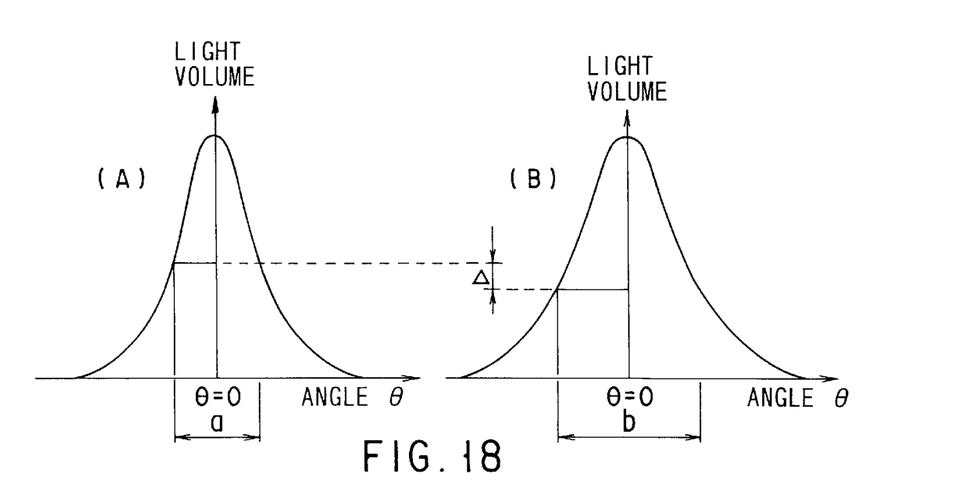
FIG. 18 provides comparison between light distribution characteristics toward cutting planes A–A' and B–B'.

FIG. 18 provides comparison between light distribution characteristics toward cutting planes A–A'and B–B' of the flash apparatus. In FIG. 18, angle "a" is a necessary angle of view in a shorter-side direction of the film exposure aperture. Angle "b" is a necessary angle of view in a longer-side direction of the film exposure aperture. As seen from the figure, this embodiment provides a difference Δ between a light volume at the end of necessary angle of view "a" and a light volume at the end of necessary angle of view "b" that in smaller than those in the prior art. This embodiment uses a reflector shape which almost matches necessary angles of view vertically and horizontally for a xenon flash lamp of the point light source type. It is possible to effectively use a xenon flash lamp energy.

(Fifth Embodiment)

Figures 19, 20A, 20B:
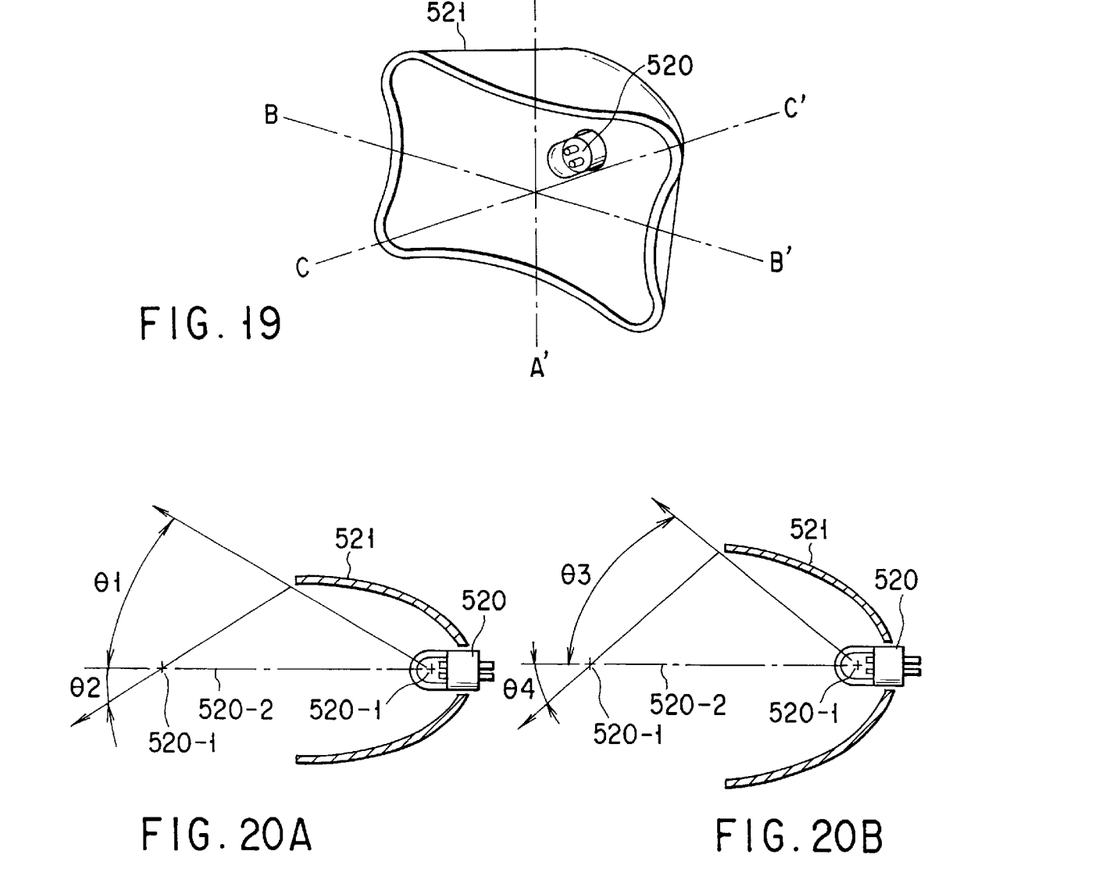
FIG. 19 is a perspective view illustrating the structure of the flash apparatus according to the fifth embodiment of the present invention.
FIGS. 20A through 20C are cross-sectional views for the flash apparatus taken in the lines A–A', B–B', and C–C' of FIG. 19.

FIG. 19 is a perspective view illustrating the structure of the flash apparatus according to the fifth embodiment of the present invention. A line C–C' indicates a diagonal direction of a film. In consideration of light distribution characteristics in a diagonal direction, this embodiment provides a reflector shape by extending a curved portion corresponding to the diagonal direction C–C' of the concave and curved reflector. The extended portion forms a smoothly curved surface. The reflector according to the fifth embodiment forms the curved portion corresponding to the diagonal direction of a rectangular photographic picture plane by continuously and smoothly varying the first and second curved-face portions described in the fourth embodiment.

FIG. 20A is a cross-sectional view of the flash apparatus taken in the line A–A' of FIG. 19. As shown in the figure, a cross section of a reflector 521 taken in the line A–A' forms an almost oval shape. The xenon flash lamp 520 is approximately positioned at a focal point 520-1 in this almost oval shape. It is supposed that $\theta 1$ is the maximum angle formed by direct light from the xenon flash lamp 520 against an illuminant optical axis 520-2. It is also supposed that $\theta 2$ is the maximum angle formed by light from the xenon flash lamp 520 reflected on an inner wall of the reflector 521 against the illuminant optical axis 520-2. When this premise holds, $\theta 1$ is almost equal to $\theta 2$.

FIG. 20B is a cross-sectional view of the flash apparatus taken in the line B–B' of FIG. 19. As shown in the figure, a cross section of a reflector 521 taken in the line B–B' forms an almost oval shape. The xenon flash lamp 520 is approximately positioned at the focal point 520-1 in this almost oval shape. It is supposed that $\theta 3$ is the maximum angle formed by direct light from the xenon flash lamp 520 against an illuminant optical axis 520-2. It is also supposed that $\theta 4$ is the maximum angle formed by light from the xenon flash lamp 520 reflected on an inner wall of the reflector 521 against the illuminant optical axis 520-2. When this premise holds, $\theta 3$ is almost equal to $\theta 4$.

Figure 20C:
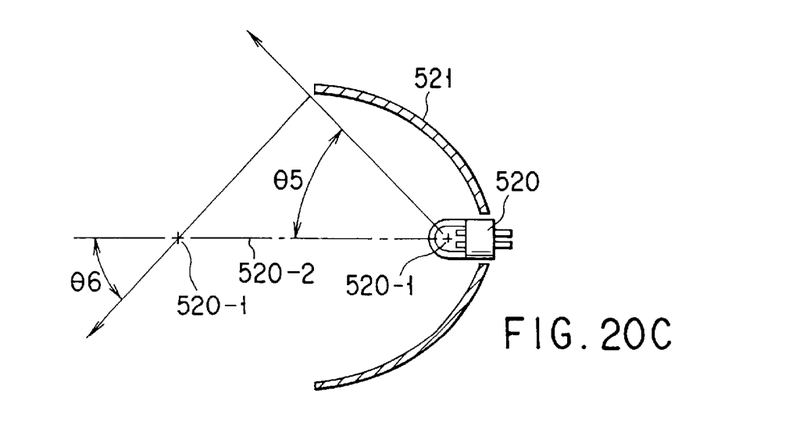

FIG. 20C is a cross-sectional view of the flash apparatus taken in the line C–C' of FIG. 19. As shown in the figure, a cross section of a reflector 521 taken in the line C–C' forms an almost oval shape. The xenon flash lamp 520 is approximately positioned at the focal point 520-1 in this almost oval shape. It is supposed that $\theta 5$ is the maximum angle formed by direct light from the xenon flash lamp 520 against an illuminant optical axis 520-2. It is also supposed that $\theta 6$ is the maximum angle formed by light from the xenon flash lamp 520 reflected on an inner wall of the reflector 521 against the illuminant optical axis 520-2. When this premise holds, $\theta 5$ is almost equal to $\theta 6$. The above-mentioned FIGS. 7A through 7C show the relationship of $\theta 1 < \theta 3 < \theta 5$, providing a largest width in the diagonal direction.

In this embodiment, $\theta 1$ is almost equal to $\theta 2$, $\theta 3$ is almost equal to $\theta 4$, and $\theta 5$ is almost equal to $\theta 6$. However, it is not necessarily maintain this relationship.

Figure 21:
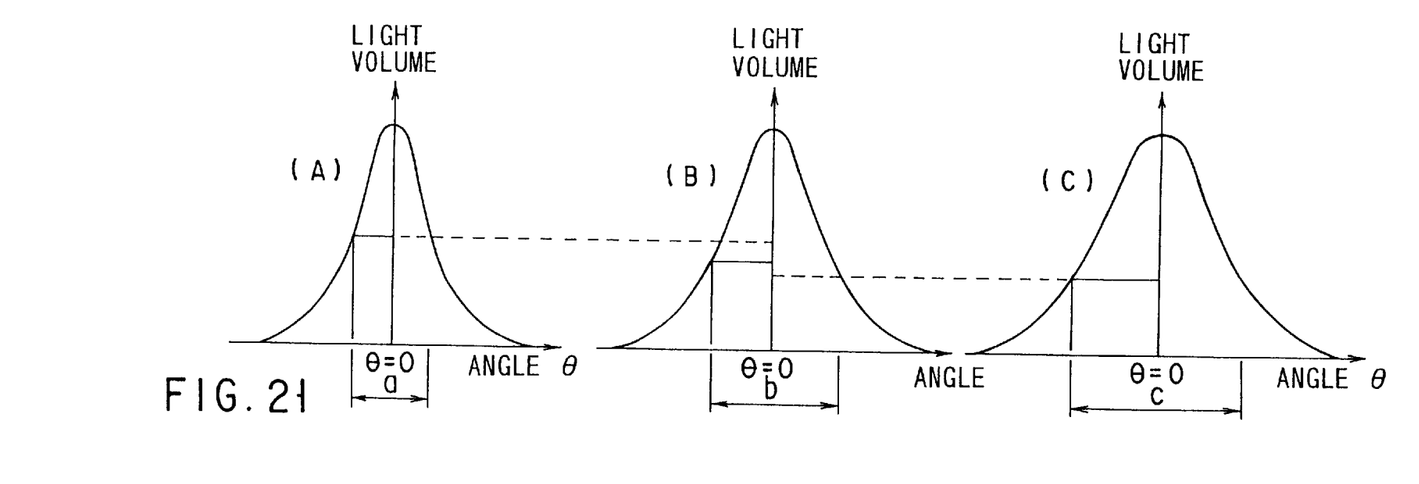
FIG. 21 shows light distribution characteristics for each cutting plane.

FIG. 21 shows light distribution characteristics for each of the above-mentioned cutting planes. The (A) of FIG. 21 provides light distribution characteristics along the cutting plane A–A'. The (B) of FIG. 21 provides light distribution characteristics along the cutting plane B–B'. The (C) of FIG. 21 provides light distribution characteristics along the cutting plane C–C'. Angle "a" in (A) of FIG. 21 is a necessary angle of view in the shorter-side direction of the film exposure aperture. Angle "b" in (B) of FIG. 21 is a necessary angle of view in the longer-side direction of the film exposure aperture. Angle "c" in (C) of FIG. 21 is a necessary angle of view in the diagonal direction of the film exposure aperture. As seen from the figure, this embodiment, compared to the prior art, causes smaller differences among a light volume at the end of the necessary angle of view "a", a light volume at the end of the necessary angle of view "b", and a light volume at the end of the necessary angle of view "c". This embodiment uses a reflector shape which almost matches necessary angles of view vertically, horizontally, and diagonally for a xenon flash lamp of the point light source type. It is possible to effectively use a xenon flash lamp energy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flash apparatus comprising:
   a flash tube having a point light source;
   a reflector which reflects light flux from said flash tube forward and whose shape is symmetrical with respect to a central axis of the point light source; and
   a diffuser panel which is fixed and placed in a light flux passing position in front of said flash tube and said reflector for diffusing the light flux from said flash tube,
   wherein said diffuser panel comprises a sheet having a flat surface and a flat undersurface that are parallel to each other, and said light flux from said flash tube is incident on the undersurface and emitted from the surface, and
   wherein said diffuser panel is formed so that a diffusion angle indicating an extent of a diffusion range of said light flux passing through said diffuser panel varies with positions between: (i) a center of said diffuser panel corresponding to said central axis of said point light source, and (ii) a periphery of said diffuser panel.

2. The flash apparatus according to claim 1, wherein said diffuser panel is formed so that the diffusion angle indicating the extent of the diffusion range of said light flux passing through said diffuser panel increases toward said center of said diffuser panel as compared to said periphery of said diffuser panel.

3. The flash apparatus according to claim 2, wherein said diffuser panel is formed so that the diffusion angle indicating the extent of the diffusion range of said light flux passing through said diffuser panel continuously increases from said periphery of said diffuser panel to said center of said diffuser panel.

4. The flash apparatus according to claim 1, wherein said diffuser panel is formed so that said light flux passing through said periphery of said diffuser panel passes through said diffuser panel substantially without diffusion.

5. The flash apparatus according to claim 1, wherein said diffusion angle with respect to light flux from said flash tube that is perpendicularly incident on the undersurface of said diffuser panel is identical on respective different concentric circles around said central axis of said point light source.

6. The flash apparatus according to claim 1, wherein said identical diffusion angles on said respective different concentric circles vary in a radial direction with respect to said central axis of said point light source.

7. The flash apparatus according to claim 1, wherein said reflector has a circular opening through which said light flux from said flash tube is emitted, and said diffuser panel is circular.

8. A flash apparatus for a camera, said flash apparatus comprising:

a flash tube having a point light source;

a reflector which reflects light flux from said flash tube forward and whose shape is symmetrical with respect to a central axis of the point light source; and a diffuser panel which is formed of a sheet and which is fixed and placed in a light flux passing position in front of said flash tube and said reflector for diffusing the light flux from said flash tube, wherein said diffuser panel is so formed that a diffusion degree of said light flux varies with positions between: (i) a center of said diffuser panel corresponding to said central axis of said point light source and, (ii) a periphery of said diffuser panel, and wherein said diffuser panel is formed so that the diffusion degree is varied between a vertical direction and a horizontal direction according to an aspect ratio of a rectangular photographic picture plane of said camera, thereby changing a circular region irradiated by light flux from said flash tube to a substantially rectangular region whose aspect ratio is substantially equal to the aspect ratio of said rectangular photographic picture plane.

9. The flash apparatus according to claim 8, wherein said diffuser panel is formed so that the diffusion angle indicating the extent of the diffusion range of said light flux passing through said diffuser panel increases toward said center of said diffuser panel as compared to said periphery of said diffuser panel.

10. The flash apparatus according to claim 8, wherein said diffusion angle with respect to light flux from said flash tube that is perpendicularly incident on the undersurface of said diffuser panel is identical on respective different ovals formed around said central axis of said point light source.

11. A flash apparatus for a camera, said flash apparatus comprising:

a flash tube having a point light source; and a reflector which reflects light flux from said flash tube forward, wherein an opening of said reflector from which said light flux is emitted is approximately rectangular, with mid-sections of short sides and long sides of the opening are bent inwardly towards said flash tube with respect to corners of said reflector, and wherein an inner surface of said reflector which is a reflection surface comprises a reflecting surface having a first curved-face portion for determining a vertical irradiating light distribution and a second curved-face portion for determining a horizontal irradiating light distribution so that irradiating light distribution characteristics of said flash apparatus can approximately correspond to a size of a rectangular photographic picture plane having vertical and horizontal sides.

12. The flash apparatus according to claim 11, wherein said first and second curved-face portions of said reflector comprise a curved portion whose shape changes continuously and smoothly in a diagonal direction of said rectangular photographic picture plane.

* * * * *